United States Patent
Weinreich et al.

(10) Patent No.: US 10,933,908 B2
(45) Date of Patent: Mar. 2, 2021

(54) METHOD AND APPARATUS FOR LIMITING TORQUE DEMANDS OF STEERING-ASSISTANCE DEVICE

(71) Applicant: Ford Global Technologies, LLC, Dearborn, MI (US)

(72) Inventors: Felix Weinreich, Cologne (DE); Frank Peter Engels, Solingen (DE); Jens Dornhege, Pulheim (DE); Goetz-Philipp Wegner, Dortmund (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/831,405

(22) Filed: Aug. 20, 2015

(65) Prior Publication Data
US 2016/0052543 A1  Feb. 25, 2016

(30) Foreign Application Priority Data
Aug. 21, 2014  (DE) .......................... 102014216574.1

(51) Int. Cl.
*B62D 6/00* (2006.01)
*B62D 5/04* (2006.01)

(52) U.S. Cl.
CPC ............. *B62D 6/00* (2013.01); *B62D 5/0481* (2013.01)

(58) Field of Classification Search
CPC ........ B62D 5/0481; B62D 6/00; B62D 5/046; B62D 5/0469; B62D 5/0463; B62D 5/0457; B62D 5/0484; B62D 6/10; B62D 6/002; B62D 5/04; G05D 1/00
See application file for complete search history.

(56) References Cited

U.S. PATENT DOCUMENTS

| | | | | |
|---|---|---|---|---|
| 6,427,104 B1 * | 7/2002 | Matsushita | .......... | B62D 5/0463 701/41 |
| 6,729,434 B2 * | 5/2004 | Stevens | ................ | B62D 5/0466 180/446 |
| 2007/0062755 A1 * | 3/2007 | Krieger | ................ | B62D 5/0472 180/446 |
| 2012/0046832 A1 * | 2/2012 | Kariatsumari | ....... | B62D 5/0463 701/41 |

FOREIGN PATENT DOCUMENTS

| | | |
|---|---|---|
| DE | 102005003178 A1 | 7/2006 |
| DE | 102005004726 A1 | 8/2006 |
| DE | 102009000868 B4 | 12/2011 |
| DE | 102013218721 A1 | 5/2014 |
| DE | 102014201107 A1 | 8/2014 |

* cited by examiner

*Primary Examiner* — Stephen Holwerda
(74) *Attorney, Agent, or Firm* — Raymond L. Coppiellie; Burgess Law Office, PLLC

(57) ABSTRACT

A method and apparatus for limiting an assistance-torque demand on an actuator, for example a servomotor, of a power steering system. An assistance-torque demand is received and examined based on a predetermined limit criterion. If a violation of the limit criterion is ascertained, a transient assistance-torque limit is adopted and progressively reduced so long as the violation of the limit criterion is ascertained. The assistance-torque demand is limited based on the transient assistance-torque limit. The limited assistance-torque demand is sent to an interface of the actuator of the power steering system.

10 Claims, 3 Drawing Sheets

METHOD AND APPARATUS FOR LIMITING TORQUE DEMANDS OF STEERING-ASSISTANCE DEVICE

CROSS-REFERENCE TO RELATED APPLICATIONS

Not applicable.

BACKGROUND OF THE INVENTION

1. Field of the Invention

The invention relates to a vehicle steering system and, more specifically, to a method and apparatus for limiting torque demands of a steering-assistance device.

2. Description of Related Art

In modern motor vehicles, a large number of assistance systems are available to the driver. A power steering system increases steering comfort because manual torque of the driver applied to the steering wheel—the force with which the driver moves the steering wheel—is measured and is intensified by a power-assistance system typically including an actuator, for example a servomotor. The servomotor, for example of hydraulic or electrical design, may also provide a steering-assistance function, which, by demanding a respective assistance torque, should realize certain convenience functions or safety functions. Typical steering-assistance devices reduce reactions on the steering due to crosswinds or properties of the roadway (e.g. variable ground surfaces, ruts or other regions of unevenness), or assist the driver in steering, such as lane-keeping assistants or lane-change assistants. Similarly, appropriate intervention by the servomotor masks undesirable influences of a differential on the steering for the driver.

Based on the complexity of these functions and their dependence on sensor data, faulty torque demands cannot be ruled out. To provide driver control of the motor vehicle, the torque demands are therefore suitably limited. For this purpose, the assistance torques capable of being demanded, for example, can be limited, individually and/or in a combined manner, based on their amplitude and change in amplitude, the restriction of the change in amplitude may cause unsatisfactory compromises to arise between performing the assistance function and the controllability if a fault occurs. A conventional system reacts slower, sometimes before a change in the direction of travel on account of the fault could be ascertained, so that a reaction of the driver may be necessary in order to re-establish the desired direction of travel.

SUMMARY OF THE INVENTION

According to one example of the invention, a method for limiting steering assistance torque of a steering system of a vehicle includes providing a sensor for obtaining vehicle operating parameters. Providing a steering assist device wherein the steering assist device generates an assistance-torque demand imposed on the steering system. Establishing a vehicle operating parameter limit criterion and determining whether a violation of the limit criterion exists. Providing a transient assistance-torque limit when a violation of the limit criterion occurs. The assistance-torque demand limited based on the transient assistance-torque limit.

The method provides an advantage wherein faulty or excessive assistance-torque demands are quickly and effectively limited by monitoring the violation of the limit criterion without reducing the performance of the steering assistance device in the case of correctly executed assistance-torque demands. Hence, the steerability of the vehicle remains stable. The method according to the invention compensates for a fault after a short time, and in so doing retains the original direction of travel. Also in the case of a non-faulty assistance-torque demand, the dynamic range of the assistance system improves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
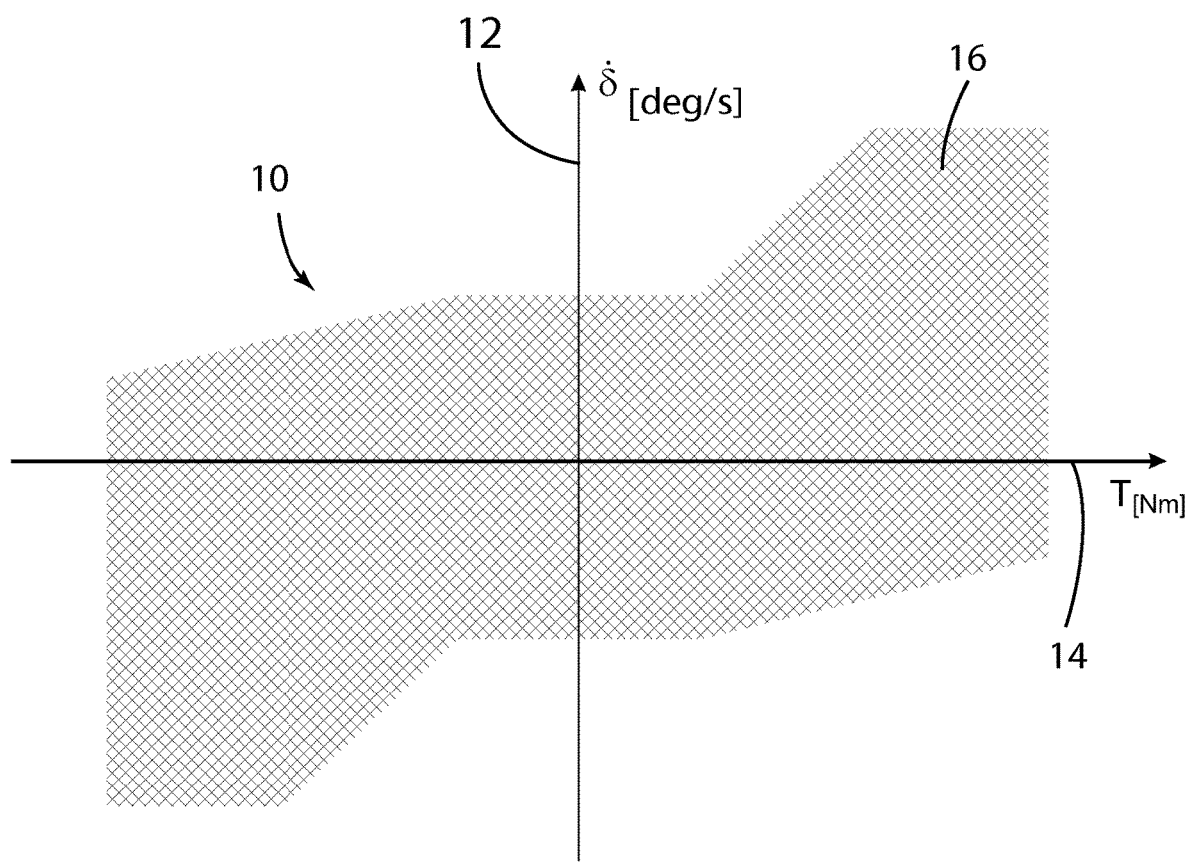
FIG. 1 is a characteristic map according to one embodiment of the present invention.

As set forth in the following exemplary embodiment the present invention is a new approach to limit the current demands of steering-assistance devices thereby controlling the torque demand amplitude and the influence on the vehicle stability/controllability. Initially, the system and vehicle state is observed via sensor and data input. Based on this information, as illustrated in FIG. 1, a determination is made whether the vehicle operating parameters exceed a predetermined limit.

Optionally, the method may include a step that detects different driving scenarios and increases the performance of a feature, while not deteriorating controllability. One example includes evaluating direction and amplitude of steering wheel speed and driver steering wheel torque. As set forth below, a temporarily increased limit could be set.

Assistance-torque demands may be limited in three ways. The first limitation is a permanent one, which reduces the torque request to an in general controllable amplitude level. This is done regardless of the limit violation. The level can be vehicle speed dependent, for example the higher the vehicle speed the lower the allowed torque amplitude.

Second, based on the detection of a limit criterion violation the torque amplitude may be ramped out dynamically. This can be done in multiple stages, which are either a fixed torque ramp out rate [Nm/s] or a dynamic ramp out rate (e.g. by a look-up table that is based on the violation). The switching between the different stages can be individually and in any order. The same principle is valid for the recovery phase until the torque limit has reached its start value. Instead of a ramp out it is a torque ramp in.

Third, the merged effective torque limit is used to saturate the feature torque request.

FIG. 1 illustrates a characteristic map used within the scope of the present invention for examination of a violation of the limit criterion. The characteristic map may be selected from a plurality of characteristic maps as a function of operating parameters of the motor vehicle, such as, for example, the speed of the motor vehicle or a yaw rate of the motor vehicle. In the illustrated characteristic map, seen generally at 10, the time derivative of the steering-wheel angle δ, consequently the rate of change of the steering-wheel angle [deg/sec]—axis 12, is plotted over the manual torque T applied by the operator or vehicle driver to the steering wheel—axis 14. The crosshatched area 16, centrosymmetrical about the origin, in the characteristic map 10 of FIG. 1 indicates permissible combinations of rates of change of the steering-wheel angle—axis 12 and manual torques of the driver—axis 14. The manual torque of the driver and the rate of change of the steering-wheel angle are examined to determine a violation of the limit criterion. Subsequently, each pair of values obtained is checked in the characteristic map 10 to determine whether the pair of values represents a permissible combination. If the pair of values lies within the crosshatched area, no violation of the limit criterion is ascertained. If, however, the pair of values lies outside the crosshatched area 16, a violation of the limit criterion is ascertained. Where appropriate, besides determining a violation of the limit criterion, the measurement, effect, or significance thereof can also be determined. For example, by an examination of how far away the pair of values lies from the crosshatched area 16 in the characteristic map 10. The result of this examination can be used in the process according to the invention in order to adapt, modify, or change the rate of reduction, at which the transient assistance-torque limit is reduced, to the circumstances of the existing violation of the limit criterion.

In addition, there may be a provision to determine a rate of change of the angle of rotation of the steering wheel, and to examine the violation of the limit criterion based on the manual torque of the driver and the rate of change of the angle of rotation of the steering wheel. If these values comply with the defined thresholds and conditions, a temporarily increased limit could be set. An additional embodiment may include use, for example, of a characteristic map in which, for all possible combinations of manual torques of the driver and rates of change of the angle of rotation of the steering wheel have been recorded whether the limit criterion has been violated. Additional embodiments include providing a plurality of such characteristic maps, such as represented in FIG. 1, for differing vehicle speeds or ranges.

Figure 2:
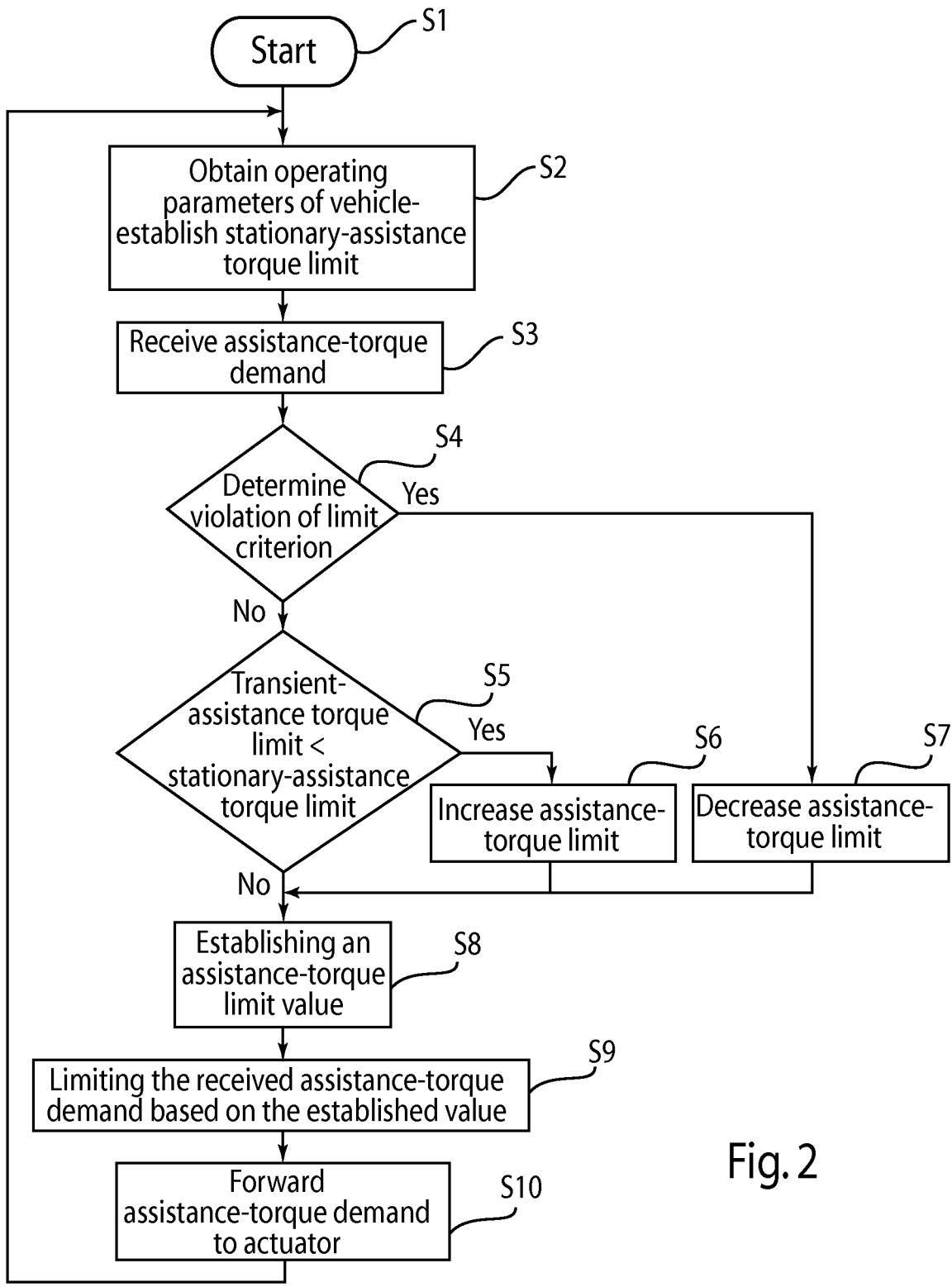
FIG. 2 illustrates a flow chart of a method of limiting assistance-torque according to an exemplary embodiment of the present invention.

FIG. 2 is a flowchart illustrating an exemplary embodiment of the method according to the invention. The method begins in a starting step S1 and continues with a step S2 in which operating parameters of the motor vehicle—such as the speed thereof, the manual torque of the driver applied to the steering wheel, the steering-wheel angle and the rate of change thereof, and further values—are registered electronically. In a following step S3, at least one assistance-torque demand to be limited is received. Where appropriate, this step also includes a summation of jointly received assistance-torque demands of various assistance systems. In the step of receiving the assistance-torque demand, several assistance-torque demands of differing assistance systems can also be received. In such a case, the assistance-torque demands can be limited separately, in a grouped manner or jointly. For example, all or some of the assistance-torque demands can be summed, and the summed assistance-torque demands can be subjected to the limitation according to the invention. In particular, separate assistance-torque limits can also be provided for each assistance-torque demand or each group of assistance-torque demands. The assistance-torque limit(s) can be determined depending on a speed of the motor vehicle. By this means, the process according to the invention can adapt itself automatically to various typical driving situations such as parking maneuvers, journeys in urban traffic, on a rural highway or on a freeway. Also by this means, rapidly changing speeds of the motor vehicle in the course of a braking and evading maneuver can be taken into account by the assistance-torque limit(s) being changed appropriately with the rapidly changing speed of the motor vehicle.

The method according to the invention may exhibit an additional step of determining a stationary assistance-torque limit. In this case, the step of limiting the at least one assistance-torque demand is then carried out not only depending on the transient assistance-torque limit but, in addition, the step depends on the stationary assistance-torque limit. For example, this may be carried out by the transient assistance-torque limit being limited by the stationary assistance-torque limit. The stationary assistance-torque limit may be determined, for example, from operating parameters such as the driving speed of the motor vehicle; it may decrease with rising driving speed. The stationary assistance-torque limit, however, is temporally invariant for a given set of operating parameters, whereas subsequent to an ascertained violation of the limit criterion the transient assistance-torque limit is changed during the subsequent course of the process. Accordingly, the stationary assistance-torque limit represents a general upper limit for the assistance-torque demands, whereas the transient assistance-torque limit is determined in process-dependent manner. Preferably, a minimum of stationary assistance-torque limit and transient assistance-torque limit is selected, and the step of limiting at least one assistance-torque demand is executed based or depending on the selected minimum. The limitation of the at least one assistance-torque demand is ordinarily carried out in signed manner, whereby a right-hand curve, for example, has been allocated to a negative algebraic sign, and a left-hand curve to a positive sign, or conversely. If an assistance-torque demand with negative algebraic sign is limited, an increase of the value of the assistance-torque demand naturally arises mathematically, whereby, the mathematical absolute value is reduced. Within the scope of the invention, the transient assistance-torque limit may exhibit respectively separate limits for the limitation of assistance-torque demands with negative and positive algebraic signs. These separate limits can then be adapted individually if a violation of the limit criterion, appropriately with a positive or negative algebraic sign, is ascertained.

Subsequently, in step S4 an examination of a limit criterion is carried out based on determined operating parameters or some selection thereof. For example, as explained above regarding FIG. 1. If a violation of the limit criterion exists, the process continues with the next step S7. Otherwise, if no violation of the limit criterion exists, the method precedes to a logic step S5 wherein a determination is made whether the transient assistance-torque limit is less than the stationary assistance-torque limit and that no violation of the limit criterion exists. For reasons of the stability of the overall procedure, a hysteresis may be defined between the violation of the limit criterion S4 and a non-violation of the limit criterion from S5. This hysteresis may both relate to the signal amplitudes in the course of the examination and be realized by a temporal delay of the actions in step S6. If the result of the examination in step S5 is positive, the process is continued with step S6; otherwise, the process branches to step S8.

If a violation of the limit criterion was ascertained in step S4, in step S7 a transient assistance-torque limit below the previous assistance-torque limit is determined and progressively reduced if a violation of the limit criterion exists. The progressive reduction may, for example, be carried out by a rate of reduction being subtracted, a single time in step S7, from the transient assistance-torque limit determined in the course of the respectively last pass, by branching back again to the start of the process after step S10, and by step S7 being executed repeatedly as a result. Preferentially, after the progressive reducing of the transient assistance-torque limit, the transient assistance-torque limit is increased if no violation of the limit criterion is ascertained any longer. Here, the transient assistance-torque limit can be returned to its initial level. This means that, if a violation of the limit criterion occurs, the assistance-torque demands are suppressed by the progressive reducing of the transient assistance-torque limit, and are included again after the end of the violation of the limit criterion (or else after a waiting period has elapsed, during which no renewed violation of the limit criterion is ascertained. So long as a violation of the limit criterion—and hence an exceptional situation—exists, the driver is inconvenienced and impaired as little as possible by the steering-assistance devices in the course of steering the motor vehicle. Subsequently, the habitual ride comfort is then re-established. For example, for this purpose the method may exhibit an additional step in which the transient assistance-torque limit is adapted and progressively increased if, and so long as, no violation of the limit criterion is ascertained. The increasing of the transient assistance-torque limit may be effected up to a predetermined maximal value, for example up to a valid stationary assistance-torque limit. The progressive reducing of the transient assistance-torque limit can be carried out with a rate of reduction depending on a magnitude of the violation of the limit criterion. For example, a greater rate of reduction can be used if a more severe violation of the limit criterion exists, and correspondingly a smaller rate of reduction if there has been a lesser violation of the limit criterion. This has the advantage that, in the case of serious violations of the limit criterion, it is possible to return more quickly to a permissible state. In embodiments with a characteristic map, the extent of a violation of the limit criterion can be determined based on a spacing of the current state from an allowed range.

If it was ascertained in step S5 that the transient assistance-torque limit is less than the stationary assistance-torque limit and no violation of the limit criterion exists, the method precedes to step S6 wherein a transient assistance-torque limit above the previous assistance-torque limit is determined and progressively increased until it reaches the stationary assistance-torque limit or, once again, a violation of the limit criterion exists. The progressive increase may, for example, be carried out by a rate of increase being added, a single time in step S6, to the transient assistance-torque limit determined in the course of the respectively last pass, by branching back again to the start of the process after step S10, and by step S6 being executed repeatedly.

Logic step S8 establishes or calculates an assistance-torque limit value based on or from the transient assistance-torque limit and a stationary assistance-torque limit, which, for example, can be derived in step S2 from the determined operating parameters. The established or minimal stationary assistance-torque limit selected is used in step S9 in order to limit the summed assistance-torque demands. There may be provision, to truncate summed assistance-torque demands going beyond the selected minimal assistance-torque limit—to set the summed assistance-torque demands to the selected assistance-torque limit if the demands exceed the assistance-torque limit. This step is also executed when no violation of the limit criterion was ascertained in step S4. In this case, in step S8 the stationary assistance-torque limit will ordinarily be selected as minimum, because the transient assistance-torque limit can never become larger than the stationary assistance-torque limit. However, should a serious malfunction occur, this preferred embodiment of the invention intervenes immediately and limits at least one assistance-torque demand without a violation of the limit criterion previously having to be ascertained. In the limiting step, at least one assistance-torque demand can be reduced to the assistance-torque limit if the at least one assistance-torque demand exceeds the assistance-torque limit. Otherwise, the at least one assistance-torque demand remains unchanged. This means that in preferred embodiments of the invention the surplus of the at least one assistance-torque demand over the respective assistance-torque limit is truncated.

As set forth above, the stationary assistance-torque limit is determined depending upon operating parameters such as driving speed of the vehicle and may decrease or increase relative to the vehicle speed. Accordingly, as set forth in step S2, the stationary assistance-torque limit is dynamic or changing speed dependent value.

As illustrated in FIG. 2, if a violation of the limit criterion occurs, step S4, the transient assistance-torque limit progressively reduces from the stationary limit towards zero, step S7. When the violation no longer occurs, step S5, the transient assistance-torque limit rises again to the maximum of the stationary limit, step S6.

Accordingly, step S7 calculates the transient assistance-torque reduction value, step S6 calculates a transient assistance-torque increase value, and step S8 establishes or calculates the transient assistance-torque limit based on stationary assistance-torque limit and the results of steps S6 and S7. Since the transient assistance-torque limit can never become larger than the stationary assistance-torque limit, logic step S8 establishes, that is selects or uses, the minimum assistance-torque limit. For example, if the transient assistance-torque limit is greater than the stationary assistance-torque limit logic step 8 establishes or selects the lower or minimum value.

In step S10, at least one assistance-torque demand limited in step S9 is sent to an interface of an actuator of the power steering system, for example, a servomotor. The limited at least one assistance-torque demand can, for example, be superimposed with a torque demand for the power assistance of the driver and/or with other torque demands, where appropriate limited by other processes, and the total torque demand can be demanded from the servomotor.

Sending the limited at least one assistance-torque demand to the interface of the servomotor of the power steering system may include a step of superimposing the limited at least one assistance-torque demand with further torque demands. For example, the limited at least one assistance-torque demand can be superimposed or summed with a torque demand for power assistance of the driver, which has been derived from a manual torque of the driver measured or determined in some other way. Because the process according to the invention limits the assistance-torque demands before they are brought together with the torque demand of the driver derived directly from the manual torque of the driver—with the classical power assistance— in this case it is ensured that the decisive action of the driver on the steering behavior of the motor vehicle is maintained, and from the point of view of the driver the habitual steering behavior of the motor vehicle is preserved. Nevertheless, the process according to the invention may also be employed within the scope of autonomous driving of a motor vehicle, in the course of which a driver does not intervene, or only intervenes exceptionally, in the steering of the motor vehicle.

Figure 3:
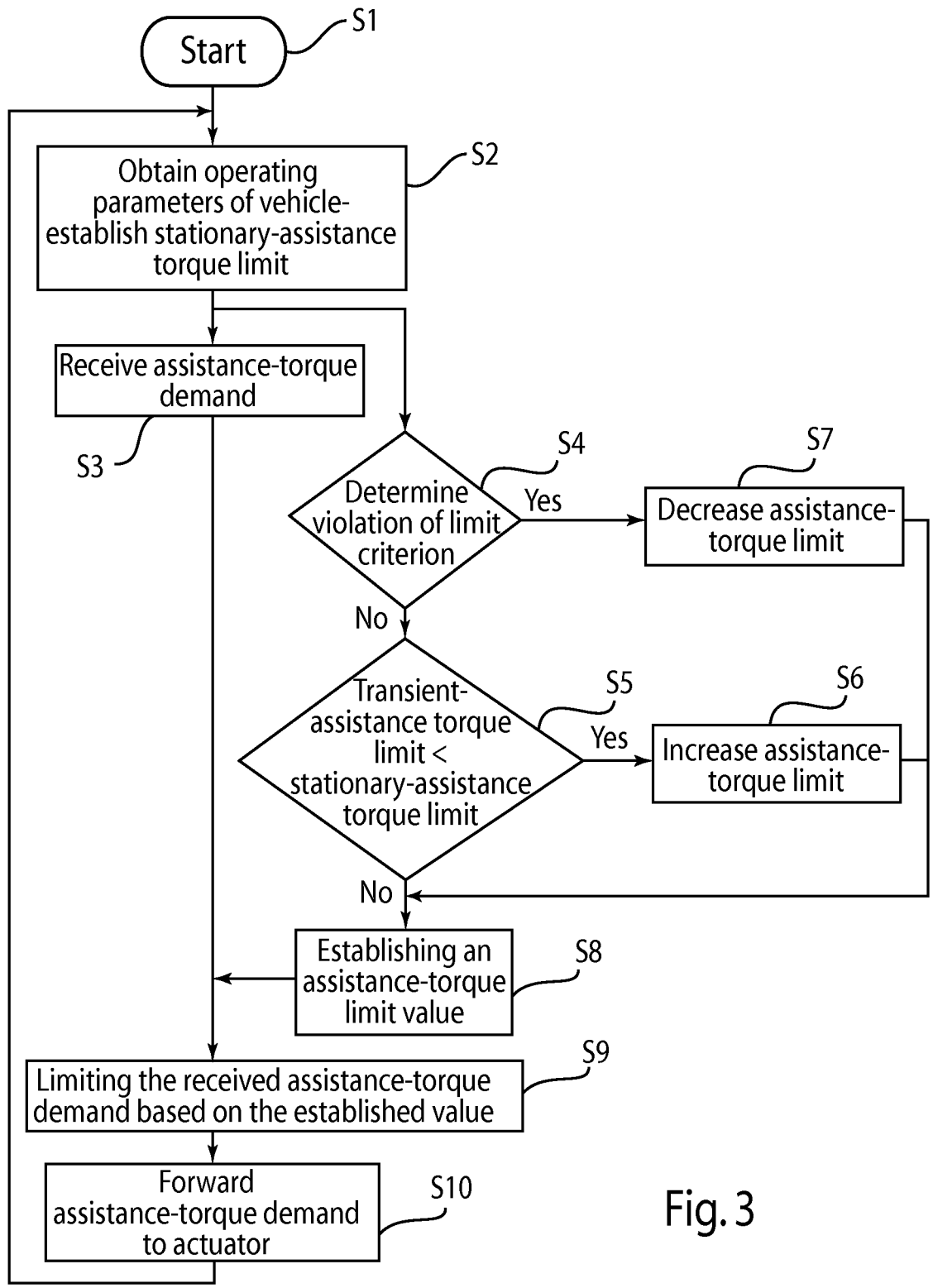
FIG. 3 illustrates a flowchart of a method of limiting assistance-torque according to a second exemplary embodiment of the present invention.

The method according to the invention enables faulty assistance-torque demands to be limited quickly and effectively, maintaining the steerability of the vehicle. The method according to the invention ensures the decisive action of the driver on the steering behavior of the vehicle, whereby from the point of view of the driver the habitual steering behavior of the vehicle is preserved, because the assistance-torque demands are limited before they are brought together with the torque demand of the driver derived directly from the manual torque of the driver—with the classical power assistance FIG. 3 illustrates a flowchart according to second exemplary embodiment of the invention. Steps S1 to S10 correspond, in terms of content, to the steps described for FIG. 2. However, in this exemplary embodiment, steps S4 to S8 are executed parallel to step S3. The order of the individual steps in the implementation of the method according to the invention has not been restricted to that shown in the exemplary embodiments. For example, some steps may be carried out simultaneously with steps shown in the exemplary embodiments to be preceding or succeeding, or the order of steps or groups of steps may be transposed. The sequence of the process may also be altered, by calculations and determinations executed in certain steps being carried out at another place, again or separately.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for limiting steering assistance torque comprising:
   providing at least one sensor obtaining vehicle operating parameters;
   providing a steering assist device, said steering assist device generating an assistance-torque demand based on vehicle speed;
   establishing a vehicle operating parameter limit criterion independent of vehicle speed using a characteristic map of a rate of change of steering wheel angle and a manual torque applied by a vehicle operator and determining whether a violation of the limit criterion exists based on said characteristic map;
   examining the manual torque applied by the vehicle operator and the rate of change of the steering wheel angle and providing a transient assistance-torque limit when a violation of the limit criterion occurs; and
   limiting the assistance-torque demand based on the transient assistance-torque limit.

2. The method of claim 1 including progressively reducing the transient assistance-torque limit when the violation is ascertained.

3. The method of claim 1 including sending the limited assistance-torque demand to a servomotor of the power steering system.

4. The method of claim 1 wherein in the step of limiting at least one assistance-torque demand at least one assistance-torque demand is reduced to the assistance-torque limit if at least one assistance-torque demand exceeds the assistance-torque limit, and otherwise remains unchanged.

5. The method of claim 3 wherein the step of sending the assistance-torque demand includes:
   determining a manual torque applied by a vehicle operator;
   determining a torque demand of the operator based on the determined manual torque applied by the operator, and
   demanding a torque from the servomotor based on a sum of the limited assistance-torque demand and the torque demand of the operator.

6. The method of claim 1 including determining a stationary assistance-torque limit; and
   limiting the assistance-torque demand based on the stationary assistance-torque limit.

7. The method of claim 6 selecting a minimum of stationary assistance-torque limit and transient assistance-torque limit; and
   limiting the at least one assistance-torque demand based on the selected minimum.

8. The method of claim 2 wherein after progressively reducing the transient assistance-torque limit the transient assistance-torque limit is increased when a violation of the limit criterion is no longer ascertained.

9. The method of claim 2 wherein progressively reducing the transient assistance-torque limit is carried out at a reduction rate depending on a magnitude of the violation of the limit criterion.

10. A motor vehicle steering system comprising:
    a steering wheel operative to generate a torque demand;
    a steering assist system generating an assistance-torque demand based on a vehicle operating parameter including, vehicle speed;
    a servomotor receiving said torque demand from said steering wheel and said assistance-torque demand from said steering assist system;
    a characteristic map of the rate of change of the steering wheel angle plotted over a manual torque applied by the vehicle operator and not including said vehicle parameter used for generating said assistance-torque demand;
    at least one sensor obtaining the rate of change of the steering wheel angle and a manual torque applied by the vehicle operator;
    generating an output based on a comparison of said at least one sensor and said characteristic map; and
    a control unit receiving said output and limiting the assistance-torque demand based on said output.

* * * * *